United States Patent [19]

Korpman

[11] 4,062,995
[45] Dec. 13, 1977

[54] RETICULAR WEB

[75] Inventor: Ralf Korpman, Bridgewater, N.J.

[73] Assignee: Johnson & Johnson, New Brunswick, N.J.

[21] Appl. No.: 699,102

[22] Filed: June 23, 1976

[51] Int. Cl.² .............................................. B32B 3/10
[52] U.S. Cl. .................................... 428/134; 264/154; 428/131; 428/910
[58] Field of Search ............... 428/131, 134, 137, 220, 428/521, 523, 910; 260/880 B, 880 R, 874; 264/154

[56] References Cited

U.S. PATENT DOCUMENTS

| | | | |
|---|---|---|---|
| 3,214,502 | 10/1965 | Schaar | 264/154 |
| 3,265,765 | 8/1966 | Holden et al. | 260/880 B X |
| 3,281,383 | 10/1966 | Zelinski et al. | 526/20 X |
| 3,519,585 | 7/1970 | Miller | 260/876 B X |
| 3,541,197 | 11/1970 | Hughes | 264/154 |
| 3,576,913 | 4/1971 | Johnson et al. | 260/880 B |
| 3,632,269 | 1/1972 | Doviak | 264/154 X |
| 3,637,554 | 1/1972 | Childers | 260/880 B X |
| 3,641,205 | 2/1972 | LaFlair et al. | 260/880 B X |
| 3,666,609 | 5/1972 | Kalwaites et al. | 428/134 |
| 3,787,531 | 1/1974 | Dahlquist et al. | 260/876 B X |
| 3,906,073 | 9/1975 | Kim et al. | 264/210 R X |

Primary Examiner—Lorraine T. Kendell

[57] ABSTRACT

A highly elastic and easily stretchable permanently shaped reticular web of an elastomeric and thermoplastic film forming composition which comprises a thermoplastic elastomeric component consisting essentially of linear or radial A-B-A block copolymers or mixtures of these linear or radial A-B-A block copolymers with simple A-B block copolymers. A resin component also may be included.

8 Claims, 2 Drawing Figures

RETICULAR WEB

The present invention relates to reticular or net-like webs of polymeric materials, more particularly to such webs which are formed by molding or heat-shaping the polymeric material with or without a subsequent orientation step.

Oriented and unoriented reticulated or net-like materials made from synthetic polymers such as the polyolefins and specifically polypropylene have become increasingly important for various end uses. The unoriented materials have found substantial use in the packaging and decorative industries, and the molecularly oriented materials have found substantial use as substitutes for woven fabrics and as reinforcements for nonwoven fabrics, paper, and the like.

U.S. Pat. No. 3,666,609 discusses the uses of such webs, particularly those that are molecularly oriented, and is directed to the problem of orientation of the net-like strand intersections. As indicated above, reticular webs or sheets of this type generally have been produced from polyolefins and similar materials and U.S. Pat. No. 3,666,609 indicates that polyesters and polyamides and other readily orientable synthetic polymers may be used as the starting material to form oriented webs. These polymeric materials or "plastics" as they somtimes are called, have limited elasticity so that the resulting reticular webs also may be limited in elasticity and related properties.

U.S. Pat. No. 3,632,269 discloses a method and apparatus for molding or heat-shaping polymeric films to form reticular webs of this general type. One of the requirements for starting material in this process is that it be thermoplastic and capable of being heat shaped to a reticular form.

I have discovered that a highly elastic and tough permanently shaped reticular web can be produced by heat shaping an elastomeric and thermoplastic film forming composition which comprises a thermoplastic elastomeric component and about 0-200 parts, preferably about 85-200 parts, of a resin component per one hundred parts by weight of the elastomeric component. The thermoplastic elastomeric component consists essentially of linear or radial A-B-A block copolymers or mixtures of these linear or radial A-B-A block copolymers with simple A-B block copolymers. In these block copolymers the A-blocks are derived from vinyl arenes such as styrene or styrene homologues and the B-blocks are derived from conjugated dienes such as isoprene or butadiene, or lower alkenes such as ethylene or butylene. The resin component consists predominantly of low molecular weight resins, preferably having a number average molecular weight not above about 3,000, and which are adapted to associate principally with the thermoplastic A-blocks of the said block copolymers. However, various other resins may be employed in minor proportions including conventional tackifying resins for the aforesaid B-blocks.

The reticular web of my invention is easily stretchable and, prior to orientation, has a 50 percent rubber modulus of not above about 2,000 pounds per square inch and an elongation to break of at least about 200 percent, preferably 400 percent, in at least one direction. It also is quite elastic and possesses an elastic recovery from 50 percent stretch of at least about 75 percent without substantial loss of its permanent shape. Normally, however, its elastic recovery is much higher, i.e., above about 90 percent. Preferably, also the web is quite thermoplastic and heat sealable and is adapted to form permanent heat seals to substrates such as paper and boxboard at relatively low heat sealing peak temperatures, generally not above about 350° F. in no more than 4 seconds of clamping time, as described more fully hereinafter.

The reticular web of this invention comprises intersecting strands or filaments which form a net-like open porous structure. The strands of this web may be molecularly oriented as by stretching and heat setting, or they may be generally nonoriented. Preferably, nonoriented reticular webs of this invention are produced by molding or heat-shaping polymeric films of the above-described elastomeric and thermoplastic film forming compositions to form the net-work of intersecting strands. Preferred processes to accomplish this are described in the hereinbefore mentioned U.S. Pat. Nos. 3,632,269 and 3,666,609. The reticular web resulting from this molding-type operation may be used in the nonoriented form, as molded, or the molded web may be subjected to subsequent steps to stretch the intersecting strands in one or more directions. In general the strands are stretched in the machine direction by means such as speed-up rollers, and in the cross direction, by means such as a tenter frame, or the like. The extent of drawing or stretching may be as high as 6 to 1 or more. Sufficient heat must at least be applied while the strands are held in their newly stretched configurations to heat set the web in stretched condition. Preferably, the newly molded web is stretched while still hot or at least still heated during stretching and to some extent after stretching to provide the necessary heat setting. However, it is an advantage of the film forming composition of this invention that the molded web may be cold stretched and then heated after stretching to assure that the stretched oriented web retains its new configuration.

As indicated hereinbefore, the film forming composition of this invention comprises an elastomeric component alone, or together with a resin component, and the elastomeric component may consist essentially of linear or radial A-B-A block copolymers or mixtures of these A-B-A block copolymers with simple A-B block copolymers. However, the proportion of A-B block copolymers in the mixture of A-B-A and A-B block copolymers should not exceed about 75 percent by weight and lower percentages normally would be used.

The A-B-A block copolymers of this invention are of the type which consist of A-blocks (end blocks) derived; i.e., polymerized or copolymerized, from vinyl arenes such as styrene or styrene homologues; and B-blocks (center blocks) derived from conjugated dienes, such as isoprene or butadiene, or from lower alkenes, such as ethylene and butylene. Small proportions of other monomers also may enter into the block copolymers themselves. Vinyl arenes suitable for the A-blocks include polymers and copolymers of vinyl halides, vinyl carboxylates, acrylics, and the like. The individual A-blocks have a number average molecular weight of at least about 6,000, preferably in the range of about 8,000 – 30,000, and the A-blocks constitute about 5–50 percent, preferably about 10–30 percent, by weight of the block copolymer. The number average molecular weight of the B-blocks for linear A-B-A block copolymers preferably is in the range of about 45,000 – 180,000 and that of the linear copolymer, itself, preferably is in the range of about 75,000 – 200,000. The number average molecular weight of the radial A-B-A block copolymers preferably is in the range of about 125,000 - 400,000. The designation A-B-A includes what are sometimes called A-B-C block copolymers wherein the end blocks are different from one another but both are derived from vinyl arenes. This aplies both to linear and radial block copolymers. The term "linear block copolymer" (or copolymers) includes branched A-B-A copolymers as well as unbranched A-B-A copolymers.

The radial A-B-A polymers useful in this invention are of the type described in U.S. Pat. No. , 3,281,383 and conform to the following general formula: $(A-B)_nX$, wherein A is a thermoplastic block polymerized from vinyl arenes such as styrene or styrene homologues, B is an elastomeric block derived from conjugated dienes or lower alkenes, as indicated above, X is an organic or inorganic connecting molecule, with a functionality of 2-4 as described in Pat. No. 3,281,383 or possibly with a higher functionality as described in the article entitled "New Rubber is Backed by Stars" appearing on page 35 of the June 11, 1975 issue of *Chemical Week*. $n$ then is a number corresponding to the functionality of X.

The A-B block copolymers of this invention are of the type described in U.S. Pat. Nos. 3,519,585 and 3,787,531 and comprise A and B-blocks derived from the monomers described hereinbefore in connection with the A-B-A copolymers.

The elastomeric component of the film forming composition of this invention may include smaller amounts of other more conventional elastomers and these generally should not exceed about 25 percent by weight of the elastomeric component. These other elastomers may include, highly broken down natural rubbers and butadiene-styrene random copolymer rubbers, synthetic polyisoprene, chloroprene rubbers, nitrile rubbers, butyl rubbers, and the like. Potentially elastomeric liquid polymers also may be employed as additives but normally in lower proportions.

The resin component of this invention, if employed, consists predominantly of low molecular weight resins which are adapted to associate principally with, and are principally compatible with, the thermoplastic A-blocks of the said block copolymers. These include low molecular weight resins based on poly-alpha-methylstyrene, polystyrene, polyvinyl toluene and similar aromatic resins, as well as copolymers thereof, coumarone indene and related cyclic compounds. Preferred resins for this purpose possess a number average molecular weight not above about 3,000 although higher molecular weight resins in the low molecular weight range also may be employed. Various other resins which may include conventional tackifying resins such as hydrocarbon resins, rosin, hydrogenated rosin, rosin esters, polyterpene resins, and the like, may be employed in minor proportions in the resin component of the film forming composition of this invention.

The film forming composition also may contain small proportions of various other materials such as antioxidants, heat stabilizers and untraviolet adsorbers, release agents, extenders, fillers and the like. Typical antioxidants are 2,5 ditertiary amyl hydroquinone and ditertiary butyl cresol. Similarly, conventional heat stabilizers such as the zinc salts of alkyl dithiocarbamates may be used. Lecithin is one release material which has been found to be particularly suitable in minor amounts in this type of extrudable particulate mixture. However, waxes and various other release agents or slip agents also may be added in this manner.

Minor amounts of various extenders such as higher molecular weight polystyrenes, nonreactive phenol-formaldehyde resins, linear polyester resins, polyethylene, polypropylene, oils, etc., also may be included in the film forming composition of this invention. Similarly, the particulate mixture of this invention may include relatively small proportions, say 25 parts by weight of the elastomeric component, of fillers and pigments such as zinc oxide, aluminum hydrate, clay, calcium carbonate, titanium dioxide, carbon black and others. Many of these fillers and pigments also may be used in powdered form as parting agents to be mixed with thermoplastic elastomer particles to prevent these particles from agglomerating prior to blending with resin particles and other materials.

Other and further features and advantages of the invention will appear to one skilled in the art from the following description, examples and claims, taken together with the drawings wherein:

Figure 1:
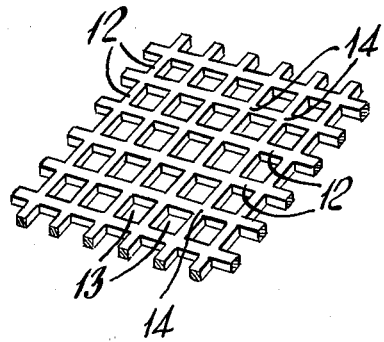
FIG. 1 is a view in perspective of a reticular web according to this invention after it has been molded or heat-shaped but before it has been molecularly oriented.
Figure 2:
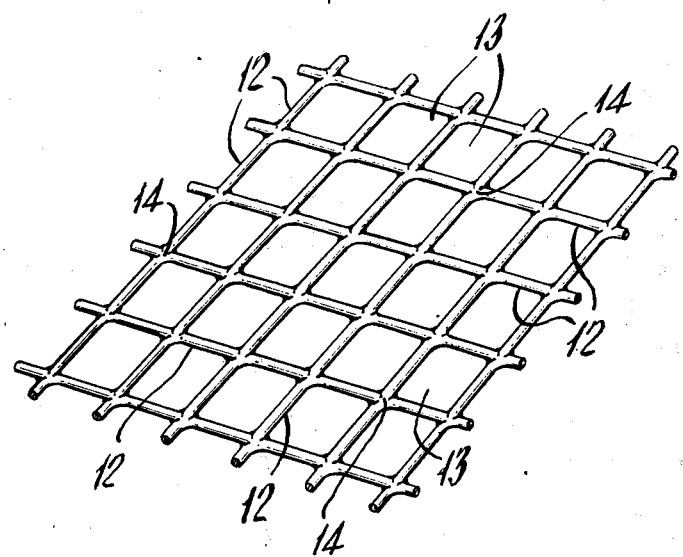
FIG. 2 is a similar view of the web of FIG. 1 after it has been stretched about 100 percent in both the machine and the cross directions.

Referring to the drawings, FIG. 1 illustrates a molded reticular web 11 of this invention which comprises strands 12 intersecting in a regular rectangular pattern and defining a corresponding pattern of holes 13 between them. In this pattern four strands 12 join each other at each intersection 14. As indicated above, FIG. 2 shows the same web after it has been stretched in both the machine and cross directions to orient the strands in the direction of their length. The webs of FIGS. 1 and 2 both are permanently shaped and will recover from deformation, such as stretching, without substantial loss of permanent shape.

Webs of this invention may be molded in any number of different patterns of intersecting strands which, in turn, may then be oriented by stretching and heat setting as described hereinbefore. These webs may find many different uses but are particularly advantageous because of their high elasticity, easy stretchability, high elongation and general conformability. Their excellent heat sealability also is highly important.

The following examples of webs according to this invention are given only by way of illustration and are not intended to limit the scope of the invention in any way. Table A gives the film forming compositions for Examples I-VII together with the physical characteristics of the resulting webs. In the examples, all proportions are expressed in parts per one hundred parts by weight of the total elastomeric component unless otherwise indicated. Films are extruded from each of the following compositions and webs of this invention are molded from these films in accordance with the teachings of U.S. Pat. Nos. 3,632,269 and 3,666,609. Each of the resulting molded webs then may be oriented in either the machine or the cross direction or in both directions. Normally, orientation is in both directions if uniform properties are desired.

In these examples, elastic recovery is percentage of immediate recovery in length after being stretched 50 percent of original length and then released to allow free return. It is a function of the amount of stretch recovered over the amount of stretch. The amount of stretch equals the length when stretched minus the original length and the amount of stretch recovered equals the length when stretched minus the length after recovery. Rubber modulus is tensile stress in pounds per square inch of initial cross section measured at one-half inch extension per inch of length or 50 percent elongation. This is called 50 percent rubber modulus.

Heat sealability is measured by clamping each film sample in an open sandwich with a sheet of standard fiberboard test material between the jaws of an Erich International Corporation Bag Sealer at 42 p.s.i. air pressure. The fiberboard is Standard Reference Material 1810 specified in U.S. Department of Commerce Standard for Tape Adhesion Testing No. 16 (M:L-B-131E, Class 2). One of the jaws is heated and the other is unheated. The boxboard is placed in contact with the heated jaw and the film in contact with the unheated jaw. Both jaws are cooled to ambient temperature by air jets prior to clamping. When the test material is in position between the jaws, the bottom jaw is heated by an electric heater to seal the film to the boxboard by heat transferred through the board. The heating time period required to heat the lower jaw to the minimum peak temperature necessary to permanently heat seal the film to the boxboard, using a clamping period of 4 seconds, then is measured. The minimum peak permanent heat sealing temperature corresponding to the time recorded, then is obtained by reference to a time-temperature calibration curve for the instrument obtained by measuring temperatures at the bonding surface of the boxboard. The minimum peak temperature referred to is that reached at the time the electric heater is deenergized at the end of the heating time period.

TABLE A

| Ingredients & Characteristics | Examples | | | | | | |
|---|---|---|---|---|---|---|---|
| | I | II | III | IV | V | VI | VII |
| Kraton 1107 S-I-S Linear Copolymer | 100 | 100 | 100 | | | 100 | 100 |
| Kraton 1102 S-B-S Linear Copolymer | | | | 100 | | | |
| Solprene 420 S-I-S Linear copolymer | | | | | 100 | | |
| Amoco 18-210 Resin | | | | | | | 150 |
| Amoco 18-290 Resin | | | 100 | | 100 | 125 | |
| Piccotex 100 Resin | 100 | | | | | | |
| Piccotex 120 Resin | | | | 100 | | | |
| Cumar 509 LX Resin | | 125 | | | | | |
| Zinc dibutyl | | | | | | | |
| Zinc Dibutyl Dithiocarbamate (Antioxidant) | 1 | 1 | 1 | 1 | 2 | 1 | 1 |
| 2,5 Ditertiary Amyl Hydroquinone (Antioxidant) | ½ | ½ | ½ | ½ | ½ | ½ | ½ |
| Titanium Dioxide Pigment | | | | 5 | | | |
| Rubber Modulus at 50% Elongation, lbs./in.$^2$ (prior to orientation) | 145 | 1925 | 800 | 450 | 115 | 1030 | 475 |
| Heat Sealing Temp. °F. | 150 | 250 | 250 | 280 | 240 | 270 | 250 |
| % Elastic Recovery After 50% Elongation | 82.5 | 92.5 | 98 | 78.5 | 95 | 92 | 95 |

It will be seen that the webs of all of the above examples are quite elastic, i.e., possess an elastic recovery after 50 percent elongation of about 80 percent or more and generally well above 90 percent. In fact, all the webs of the examples have an elastic recovery of over 90 percent except for those formulated with the Piccotex polyalphamethylstyrene-vinyl toluene resins. Furthermore, all the webs possess a low rubber modulus, i.e., below about 2,000 lbs./in.$^2$ at 50 percent elongation and all but one have a modulus at 50% elongation of not above about 1,000 lbs./in.$^2$. The maximum permanent heat sealing temperature, determined as described hereinbefore, ranges between 150° F. and 280° F., well below 350° F., for all of the examples.

The following Examples VII – XI illustrate web film forming compositions according to this invention wherein the proportion of resin component is reduced, i.e., ranging from 50 parts down to zero. Again, in these examples all proportions are expressed in parts per 100 parts of the total elastomeric component. Webs are formed from films produced from each of these compositions, as described in connection with Examples I – VII. The resulting webs of this invention are highly elastic and easy to stretch, and possess high elongation to break properties and excellent heat sealability.

TABLE B

| Ingredients | Examples | | | |
|---|---|---|---|---|
| | VIII | IX | X | XI |
| Kraton 1107 S-I-S Linear Block Copolymer | 100 | 100 | | |
| Kraton 1102 S-B-S Linear Block Copolymer | | | 100 | |
| Kraton G1650 S-PB-S Linear Block Copolymer | | | | 100 |
| Cumar 509 LX Solid Resin | | | 50 | |
| Amoco 18-210 Solid Resin | | 25 | | |
| Piccotex 120 Solid Resin | | | | 25 |
| Zinc Dibutyl Dithiocarbamate (Antioxidant) | 2 | 2 | 2 | 2 |
| 2,5 Ditertiary Amyl Hydroquinone (Antioxidant) | 0.5 | 0.5 | 0.5 | 0.5 |

In the foregoing examples Kraton 1107 copolymer is a thermoplastic elastomeric A-B-A (styrene-isoprene-styrene) block copolymer of this invention offered by the Shell Chemical Company, wherein the styrene content (that of the A-blocks) is about 12–15 percent, closer to 15 percent by weight of the block copolymer, and the polymer possesses a solution viscosity of about 2,000 centipoises at 25 percent solids in toluene at room temperature (using a Brookfield Viscometer with a No. 4 spindle at 60 r.p.m.), and a number average molecular weight of about 110,000 – 125,000. Kraton 1102 copolymer is another A-B-A block copolymer offered by Shell but this is a styrene-butadiene-styrene copolymer wherein the styrene blocks constitute about 30 percent of the copolymer. The number average molecular weight of Kraton 1102 copolymer also is about 125,000.

Kraton G1650 is a different A-B-A block copolymer offered by the Shell Chemical Company wherein the A-blocks are derived from styrene and the center or B-block is a copolymer of ethylene and butylene. This copolymer has a solution viscosity at 25 percent solids in toluene of 12,000 cps. when measured with a Brookfield Model RVT viscosimeter.

Solprene 420 copolymer is a radial styrene-isoprene-sytrene block copolymer of the type described hereinbefore which has a number average molecular weight of 240,000 and a styrene content of about 15 percent.

Cumar 509 LX resin is a solid coumarone indene resin offered by the Neville Chemical Co., and having a softening point of about 145° C. Amoco 18-210 and 18-290 resins are solid polyalphamethylstyrenes offered by Amoco Chemical Co., with softening points of about 210° F. (99° C.) and 290° F. (143° C.), respectively. Piccotex 100 and 120 resins are polyalphamethylstyrene-vinyl toluene copolymers offered by Hercules Chemical Co., with melting points of 100° C. and 120° C., respectively.

Having now described the invention in specific detail and exemplified the manner in which it may be carried into practice, it will be readily apparent to those skilled in the art that innumerable variations, applications, modifications, and extensions of the basic principles involved may be made without department from its spirit or scope.

What is claimed is:

1. A permanently heat shaped elastic and thermoplastic reticular web which comprises strands intersecting in a pattern and defining a corresponding pattern of holes, said web being formed from an elastomeric and thermoplastic composition which comprises an elastomeric component and about 0–200 parts of a resin component per one hundred parts by weight of the elastomeric component, said elastomeric component consisting essentially of linear or radial A-B-A block copolymers or mixtures of these linear or radial A-B-A copolymers with simple A-B block copolymers, said A-blocks being derived from vinyl arenes and said B-blocks being derived from conjugated dienes or lower alkenes, and said web being easily stretchable and elastic and adapted to recover from deformation without substantial loss of its permanent shape.

2. A reticular web according to claim 1, which possesses an elastic recovery from 50 percent stretch of at least about 75 percent.

3. A reticular web according to claim 2, which possesses an elastic recovery from 50 percent stretch of at least about 90 percent.

4. A reticular web according to claim 1, wherein the web possesses permanent heat-sealability to fiberboard when pressed together with said fiberboard for a period no longer than 4 seconds at a peak temperature of not above about 350° F. at the interface between the web and the fiberboard as described herein.

5. A reticular web according to claim 1, which possesses a rubber modulus of not above about 2,000 pounds per square inch prior to orientation.

6. A reticular web according to claim 1, wherein the vinyl arenes are styrene or styrene homologues.

7. A reticular web according to claim 1, wherein the strands are oriented in the direction of their length in at least one direction parallel to the surface of the web.

8. A reticular web according to claim 7, wherein all of the strands are oriented in the direction of their length.

* * * * *

UNITED STATES PATENT AND TRADEMARK OFFICE
CERTIFICATE OF CORRECTION

PATENT NO. : 4,062,995
DATED : December 13, 1977
INVENTOR(S) : Korpman

It is certified that error appears in the above-identified patent and that said Letters Patent are hereby corrected as shown below:

In Column 3, line 11, "U.S. Pat. No.," should read
---U.S. Pat. No.---
In Column 5, line 39, Table A, under column heading
"Ingredients and Characteristics", 6th item listed,
"Linear copolymer" should read ---Radial copolymer---
In Column 5, line 43, Table A, under column heading
"Ingredients and Characteristics", 12th item listed,
"Zinc dibutyl" should be deleted.
In Column 7, line 4, "without department" should read
---without departing---

Signed and Sealed this

Tenth Day of October 1978

[SEAL]

Attest:

RUTH C. MASON
Attesting Officer

DONALD W. BANNER
Commissioner of Patents and Trademarks